United States Patent [19]

Krennrich et al.

[11] Patent Number: 4,725,311

[45] Date of Patent: Feb. 16, 1988

[54] PROCESS FOR PRODUCING ALKALI METALS IN ELEMENTAL FORM

[75] Inventors: Otmar Krennrich, Oberursel; Gottfried Brendel, Bad Homburg; Wilfried Weiss, Oberursel, all of Fed. Rep. of Germany

[73] Assignee: Metallgesellschaft Aktiengesellschaft, Frankfurt am Main, Fed. Rep. of Germany

[21] Appl. No.: 43,160

[22] Filed: Apr. 27, 1987

[30] Foreign Application Priority Data

Apr. 30, 1986 [DE] Fed. Rep. of Germany ....... 3614698

[51] Int. Cl.⁴ ............................................. C22B 26/10
[52] U.S. Cl. ...................................... 75/66; 75/97 R; 75/97 A; 75/109; 75/121
[58] Field of Search ............... 75/66, 97 R, 97 A, 109, 75/121; 210/710, 719, 757, 723

[56] References Cited

U.S. PATENT DOCUMENTS

| | | | |
|---|---|---|---|
| 1,818,881 | 8/1931 | Busch et al. | 75/66 |
| 2,028,390 | 1/1936 | Hanson | 75/66 |
| 2,465,730 | 3/1949 | Kroll | 75/66 |
| 2,480,655 | 8/1949 | Jackson et al. | 75/66 |
| 3,293,025 | 12/1966 | Jones | 75/66 |
| 3,432,156 | 3/1969 | Jones | 75/66 |
| 3,854,933 | 12/1974 | Furukawa et al. | 75/66 |

*Primary Examiner*—Patrick P. Garvin
*Assistant Examiner*—Paige C. Harvey
*Attorney, Agent, or Firm*—Karl F. Ross; Herbert Dubno

[57] ABSTRACT

A process of producing alkali metal by a reduction of alkali metal compounds with metallic reducing agents, which is simplified and avoids corrosion of the reaction vessel and part thereof in that the reduction is effected with particulate magnesium in an organic solvent which under the conditions of the process is inert to the alkali metal to be produced. The reaction is effected at temperatures from 100° to 300° C. In an embodiment of the process the reduction is effected in the presence of an alcohol used as a reaction accelerator.

19 Claims, No Drawings

PROCESS FOR PRODUCING ALKALI METALS IN ELEMENTAL FORM

FIELD OF THE INVENTION

Our present invention relates to a process for producing alkali metals in elemental form by a reduction of corresponding alkali metal compounds with metallic (elemental) magnesium.

BACKGROUND OF THE INVENTION

It is known that particularly potassium metal can be produced by thermochemical processes (German Patent Publication No. 19 32 129). The starting compounds used for that purpose are mainly potassium halides, potassium carbonate or potassium hydroxide and the reducing agents used are mainly coal, calcium carbide, aluminum, magnesium, silicon or ferrosilicon.

In the process disclosed in U.S. Pat. No. 2,480,655, potassium metal is produced by a reduction of molten potassium compounds by means of sodium metal. Such processes can be carried out only at high temperatures in the range from 500° to 1300° C. and it may be necessary to use a reduced pressure.

Processes which comprise melting involve a high energy consumption and require equipment consisting of special materials, such as stainless steel.

OBJECT OF THE INVENTION

It is an object of the invention to provide for the production of alkali metals an improved process which can be carried out in a simple manner and without requiring molten phases during the formation of the alkali metal.

DESCRIPTION OF THE INVENTION

In a process of producing alkali metals by a reduction of alkali compounds with a metallic reducing agent, this object is accomplished in accordance with the invention in that the reduction is effected with particulate magnesium in a solvent which under the conditions of the process is inert to the alkali metal to be produced.

The organic solvents which are nonreactive with the alkali metal to be produced include saturated aliphatic or cycloaliphatic hydrocarbons, which particularly have 8 to 20 carbon atoms in straight or branch chains or in cyclic form, such as decane, undecane, dodecane, decahydro-naphthalene, also commercially available special gasolines having boiling ranges between 150° and 250° C., such as Shellsol T, Shellsol D 70, kerosene. Said special gasolines have, e.g., a composition of 5% naphthenes, 3% n-paraffins, 92% isoparaffins or a composition of 40% naphthenes, 30% paraffins, 30% isoparaffins.

Magnesium is used as the metallic reducing agent. The magnesium is suitably employed in granular or powder form, particularly in the form of turnings. In the selection of the particle size or fineness of the magnesium metal a possible increase of the reactivity of the system owing to a higher hydration water content of the alkali metal hydroxide must be taken into account.

Starting compounds for the alkali metal to be produced, such as sodium, potassium, rubidium or cesium, include particularly the hydroxides or alkoxides of the alkali metal.

The reduction of the alkali metal compounds to form the metal may be described by the following illustrative reaction equations:

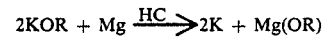

where HC represents the inert solvent, ROH a possible alcohol or alcoholate reaction promoter.

If the hydroxide contains hydration water, a dehydration, which is violent in case of a high hydration water content, is initiated by the magnesium with formation of hydrogen and magnesium hydroxide or—at higher temperatures—of magnesia.

The reduction is preferably effected in the temperature range from 100° to 300° C., preferably from 150° to 250° C., under normal or increased pressure. The reduction time is about 1 to 8 hours. To carry out the process in accordance with the invention the starting components, such as potassium hydroxide or potassium alkoxide, are charged together with particulate magnesium, e.g. magnesium chips, into a reactor, which may be pressure-resistant and which has previously been supplied with the inert organic solvent. The reactor is provided with heating means, a stirrer, a reflux condenser and means for supplying inert gas.

Where alkali hydroxides are used, it has proved suitable to accelerate the reaction by an addition of alcohol or alcoholate. Preferred reaction accelerators are alcohols having 3 to 8 carbon atoms, such as propanol, butanol, pentanol, particularly tertiary butanol or tertiary pentanol, or the corresponding alkali metal alcoholates.

In the inert solvent the reaction mixture forms a dispersion having a solids content of about 20 to 25% by weight. The alkali metal compounds and the magnesium metal are used in equimolar quantities. Any reaction accelerator will be used in a quantity of about 5 to 10 mole percent of the quantity of the alkali metal hydroxide.

The alkali metal which has been formed may be separated by processes known per se, such as distillation, filtration or gravity separation with solvents having a suitable density.

The advantages afforded by the process in accordance with the invention reside in that the alkali metals can easily be produced at relatively low temperatures, the reactor employed may be structurally simple and consist of inexpensive materials, and corrosion will be avoided.

SPECIFIC EXAMPLES

The invention will be explained more in detail with reference to the following Examples.

EXAMPLE 1

Production of Potassium Metal From Potassium Hydroxide

This Example concerns the production of potassium metal in a general process and experimental setup which can be used also to produce other alkali metals.

In a 1-liter four-neck flask, 31.1 g (1.278 moles) magnesium chips, 61.2 potassium hydroxide (1.000 mole kOH, 0.278 mole $H_2O$) and 500 ml Shellsol D 70 are heated to the boiling point of the solvent. At a temperature of about 100° to 130° C., a violent evolution of $H_2$ is initiated (about 1 liter/min). 278 millimoles $H_2$ have been evolved after 1 hour. The rate of gas evolution distinctly decreases toward the end of that time.

At the boiling temperature (about 200° C.), about 6.0 grams tertiary butyl alcohol (80 millimoles) dissolved in 6 g Shellsol D 70 are slowly added in drops within half an hour. 80 millimoles $H_2$ are evolved. Under constant stirring, the evolution of $H_2$ (total 460 millimoles) and the formation of potassium metal are continues and are terminated after about 4 hours.

This is succeeded by cooling to 70° C. with stirring. Then the stirrer is stopped and the cooling is continued under an argon atmosphere. Until the colorless reaction solution is cold, white magnesia and a regulus of potassium metal have settled to the bottom. The solvent is subsequently distilled off under a vacuum (p=1 torr) or is filtered off.

200 ml 1,4-dioxane are then added to the residue at room temperature, followed by heating to 60° to 100° C. As a result, the potassium rises to the surface and is comminuted by stirring to form spheres of suitable size. When the desired spherical shape has been achieved, the stirrer is stopped and the contents of the vessel is permitted to cool. The reaction product mixture is then transferred to a separating vessel and is washed with dioxane. When the magnesia has settled, the vessel is drained to separate the potassium from the MgO and dioxane. The potassium is then melted on a filter medium and is sucked under a slight vacuum into a flask. Potassium having a silvery luster is obtained in a yield of 34.0 g, corresponding to 87% of theoretical yield.

The dioxane-MgO suspension is filtered at room temperature through a frit. The residue consisting of MgO is dried in a vacuum at room temperature. The dioxane is completely recovered from the filtrate by distillation. A residue is left, which consists of potassium tertiary butylate, which has been formed by the reaction of the tertiary butyl alcohol.

EXAMPLE 2

Production of Sodium Metal From Sodium Hydroxide

In a reactor as described in Example 1, 40.9 g (1.023 moles) sodium hydroxide, 25.2 g (1.037 moles) magnesium chips and 9.7 g (0.101 mole sodium tertiary butylate in 314 g Shellsol D 70 are reacted at the boiling temperature of 210° C. with stirring for 15 hours. The solvent is subsequently removed by vacuum distillation (120° C., 20 millibars) and is thus completely recovered. 350 g dioxane are added to the residue and the resulting mixture is heated to the boiling point with stirring. When the sodium has the desired particle size, the stirrer is stopped, the dispersion is permitted to cool and the sodium metal which has risen to the surface is skimmed off. Yield: 19.8 g (84% of theoretical yield).

EXAMPLE 3

Production of Potassium Metal From Potassium Alcoholate

In the reactor described in Example 1, a mixture of 74.8 g potassium tertiary amylate (0.59 mole), 7.3 magnesium chips (0.3 mole) and 400 ml decalin is heated with stirring at 150° C. for 3 hours. A regulus consisting of 15.1 g (0.38 mole) potassium is recovered from the cold reaction product mixture. Yield: 65.5%.

EXAMPLE 4

Production of Sodium Metal From Sodium Alcoholate

In the reactor described in Example 1, a mixture of 19.24 g sodium tertiary butylate (200 millimoles), 2.48 g magnesium chips (102 millimoles) and 150 ml Shellsol D 70 is reacted with stirring and refluxing for 1.5 hours.

From the cold reaction product mixture, a sodium regulus with adherent magnesia is recovered and is cleaned by filtration at 100° C. through a frit. Sodium yield: 1.2 g (25% of theoretical yield).

EXAMPLE 5

Production of Cesium Metal From Cesium Hydroxide

In the procedure described in FIG. 1, a mixture of 32.5 g cesium hydroxide (217 millimoles), 5.4 g magnesium chips (220 millimoles) and 300 ml undecane are heated with stirring at the boiling temperature of 196° C. in the procedure of Example 1. 1.6 g (22 millimoles) tertiary butanol dissolved in undecane are then added in drops during 25 min and the contents of the reactor is heated with refluxing for additional 13 hours ($H_2O$ evolution: 22 millimoles). After cooling to temperatures below the melting point of cesium, the reaction product mixture is poured onto a fine-mesh sieve to separate cesium regulus having a silvery luster from the magnesia. When the molten cesium has been filtered through a frit, the pure metal is obtained in a yield of 11.2 g, corresponding to 39% of theory.

EXAMPLE 6

Production of Cesium Metal From Cesium Alkoxide

In a reactor as described in Example 1, 69.6 g cesium hydroxide (443 millimoles CsOH, 176 millimoles $H_2O$) and 18.0 g (741 millimoles) magnesium chips in 300 ml dodecane are heated. with stirring at the boiling temperature (216° C.) for 1.5 hours. The $H_2$ evolution resulting from the dehydration amounted to 180 millimoles.

Thereafter, a mixture of 33.0 g (445 millimoles) tertiary butanol and 50 ml dodecane is added in drops within 2 hours and the mixture is then maintained at the boiling temperature for an additional hour. This resulted in an evolution of 440 millimoles $H_2$ owing to the formation of cesium tertiary butylate.

The reaction product mixture consisted of a grey suspension and contained cesium spheres, which has a silvery luster and had been formed by the reaction of the cesium tertiary butylate with the surplus magnesium metal (122 millimoles). When the reaction product mixture had cooled to about 20° C. it was filtered through a sieve to separate the cesium metal. Yield: 11.7 g (88 millimoles)=36% of theoretical yield. The filtrate that had passed through the sieve was filtered through a frit. The residue retained on the frit was washed several times with tetrahydrofurane.

From the frit filtrate containing 276 millimoles cesium butylate and 84 millimoles magnesium butylate, pure cesium butylate could be recovered by recrystallization from a mixture of tetrahydrofurane and toluene.

We claim:

1. A process for producing an alkali metal in elemental form which comprises the steps of:
    (a) reacting an alkali metal compound with particulate magnesium in an organic solvent inert to the alkali metal under the conditions of the reaction to reduce the alkali metal of said compound to elemental form; and (b) recovering the alkali metal in elemental form from said solvent.

2. The process defined in claim 1, further comprising the step of accelerating the reaction in step (a) by carrying out the reaction in step (a) in the presence of an alcohol having 3 to 8 carbon atoms or an alkali-metal alcoholate of said alcohol as a reaction accelerator.

3. The process defined in claim 2 wherein the organic solvent used in step (a) as a medium for the reaction is a saturated aliphatic or cycloaliphatic hydrocarbon having 8 to 20 carbon atoms.

4. The process defined in claim 3 wherein the reaction is step (a) is carried out at a temperature of substantially 100° C. to 300° C.

5. The process defined in claim 4 wherein said temperature is 150° C. to 250° C.

6. The process defined in claim 5 wherein said solvent is selected from the group which consists of decane, undecane, dodecane, decahydronaphthalene, and compositions consisting essentially of naphthenes, n-paraffins and iso-paraffins.

7. The process defined in claim 6 wherein the alkali metal is selected from the group which consists of sodium, potassium, rubidium and cesium.

8. The process defined in claim 7 wherein the compound is a hydroxide or alkoxide of the alkali metal.

9. The process defined in claim 1 wherein the organic solvent used in step (a) as a medium for the reaction is a saturated aliphatic or cycloaliphatic hydrocarbon having 8 to 20 carbon atoms.

10. The process defined in claim 9 wherein the reaction is step (a) is carried out at a temperature of substantially 100° C. to 300° C.

11. The process defined in claim 10 wherein said temperature is 150° C. to 250° C.

12. The process defined in claim 11 wherein said solvent is selected from the group which consists of decane, undecane, dodecane, decahydronaphthalene, and compositions consisting essentially of naphthenes, n-paraffins and iso-paraffins.

13. The process defined in claim 12 wherein the alkali metal is selected from the group which consists of sodium, potassium, rubidium and cesium.

14. The process defined in claim 13 wherein the compound is a hydroxide or alkoxide of the alkali metal.

15. The process defined in claim 1 wherein the reaction is step (a) is carried out at a temperature of substantially 100° C. to 300° C.

16. The process defined in claim 15 wherein said temperature is 150° C. to 250° C.

17. The process defined in claim 16 wherein said solvent is selected from the group which consists of decane, undecane, dodecane, decahydronaphthalene, and compositions consisting essentially of naphthenes, n-paraffins and iso-paraffins.

18. The process defined in claim 17 wherein the alkali metal is selected from the group which consists of sodium, potassium, rubidium and cesium.

19. The process defined in claim 18 wherein the compound is a hydroxide or alkoxide of the alkali metal.

* * * * *